(12) United States Patent
Powell

(10) Patent No.: US 7,549,331 B1
(45) Date of Patent: Jun. 23, 2009

(54) NOSE SECTION FOR A PITOT PROBE

(76) Inventor: Bradley J. Powell, 49 Pepperbush La., Guilford, CT (US) 06437

( * ) Notice: Subject to any disclaimer, the term of this patent is extended or adjusted under 35 U.S.C. 154(b) by 0 days.

(21) Appl. No.: 12/006,413

(22) Filed: Jan. 2, 2008

Related U.S. Application Data

(60) Provisional application No. 60/881,862, filed on Jan. 23, 2007.

(51) Int. Cl.
*G01P 13/00* (2006.01)

(52) U.S. Cl. .................. 73/170.02; 73/182

(58) Field of Classification Search ............... 73/182, 73/170.02, 170.01, 861.65
See application file for complete search history.

(56) References Cited

U.S. PATENT DOCUMENTS

| | | | |
|---|---|---|---|
| 4,823,615 A * | 4/1989 | Taha | 73/861.66 |
| 6,164,143 A * | 12/2000 | Evans | 73/861.65 |
| 6,490,510 B1 * | 12/2002 | Choisnet | 701/14 |
| 6,591,696 B2 * | 7/2003 | Bachinski | 73/861.65 |
| 6,679,112 B2 * | 1/2004 | Collot et al. | 73/170.04 |
| 6,883,389 B2 * | 4/2005 | Eldridge | 73/861.65 |
| 7,124,630 B2 * | 10/2006 | Hanson et al. | 73/170.02 |
| 7,155,968 B2 * | 1/2007 | Collot et al. | 73/170.02 |
| 2002/0184943 A1 * | 12/2002 | Collot et al. | 73/170.02 |
| 2003/0010130 A1 * | 1/2003 | Bachinski | 73/747 |
| 2007/0107510 A1 * | 5/2007 | Agami et al. | 73/182 |

* cited by examiner

*Primary Examiner*—Andre J Allen
(74) *Attorney, Agent, or Firm*—Ted Masters

(57) ABSTRACT

A nose section for a heated air pressure probe includes a barrier having a wall which blocks the direct longitudinal intake of air from an inlet, and diverts the air through one or more bypass ports. A heater is located in the barrier. Both the wall and the heater are located near the front of the inlet.

8 Claims, 4 Drawing Sheets

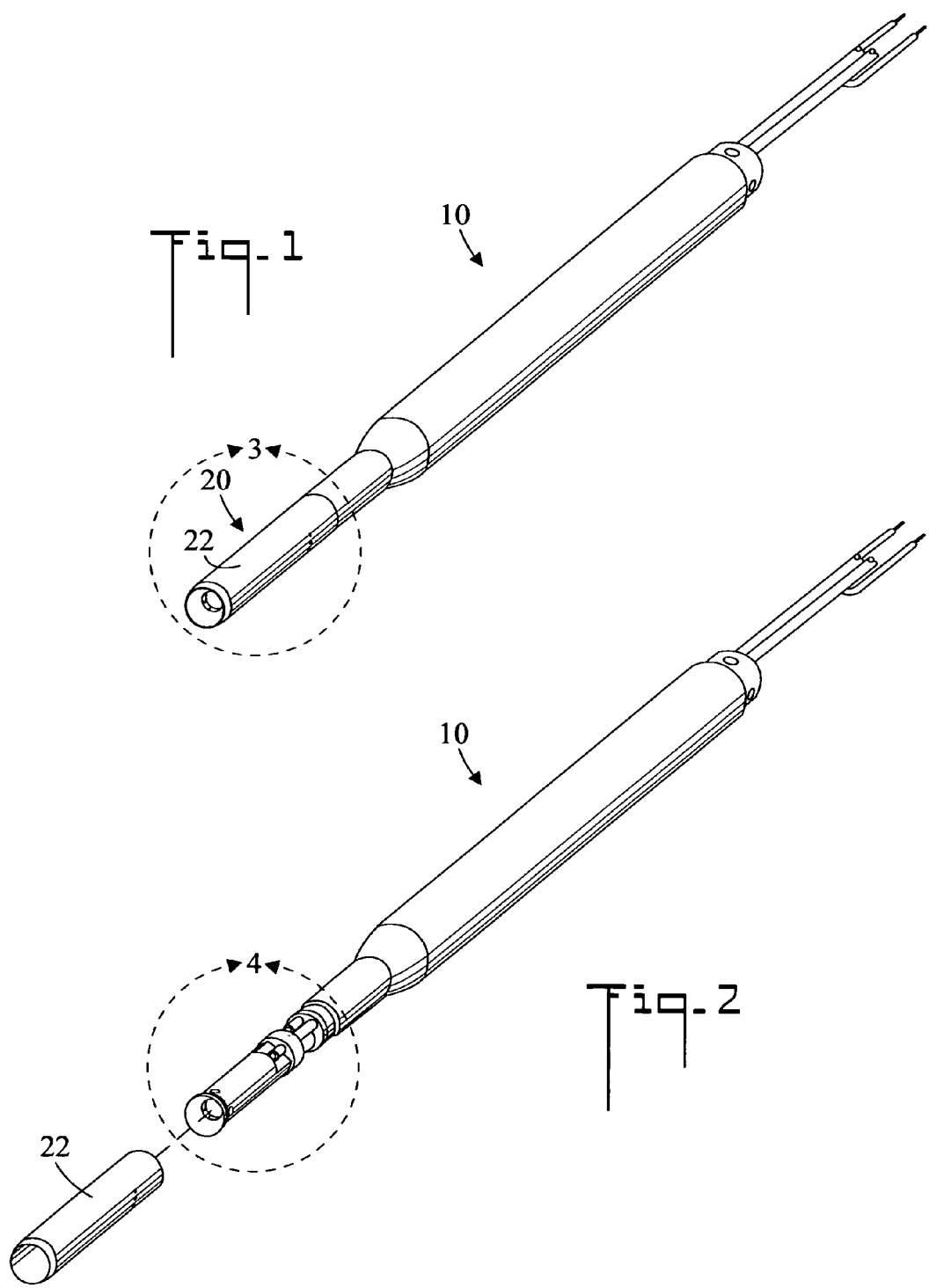

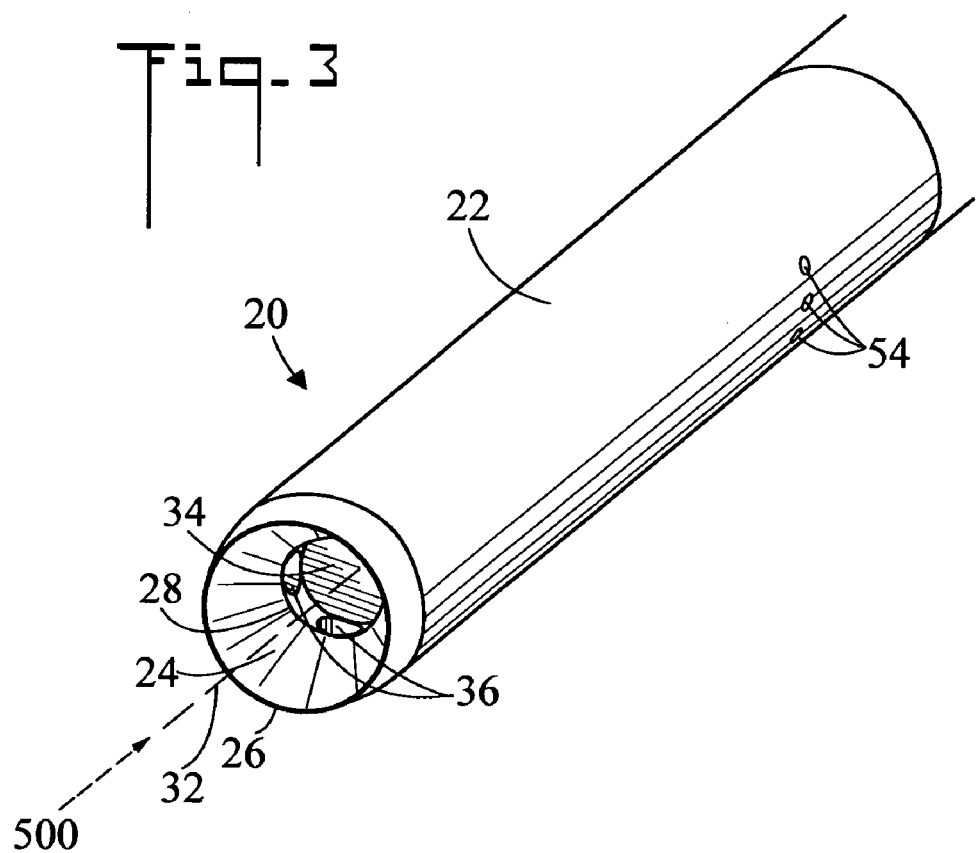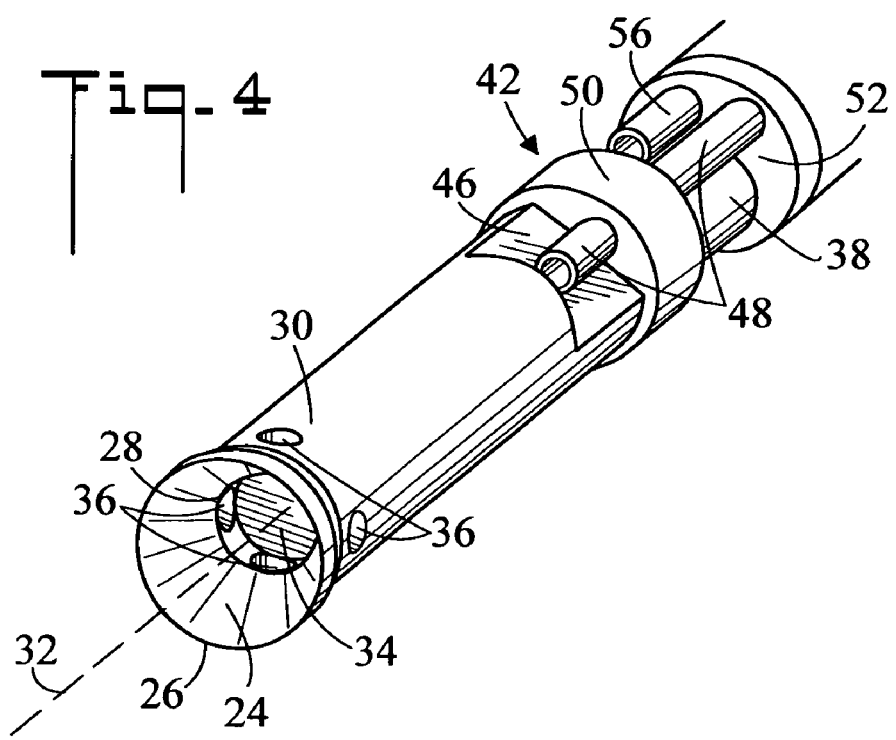

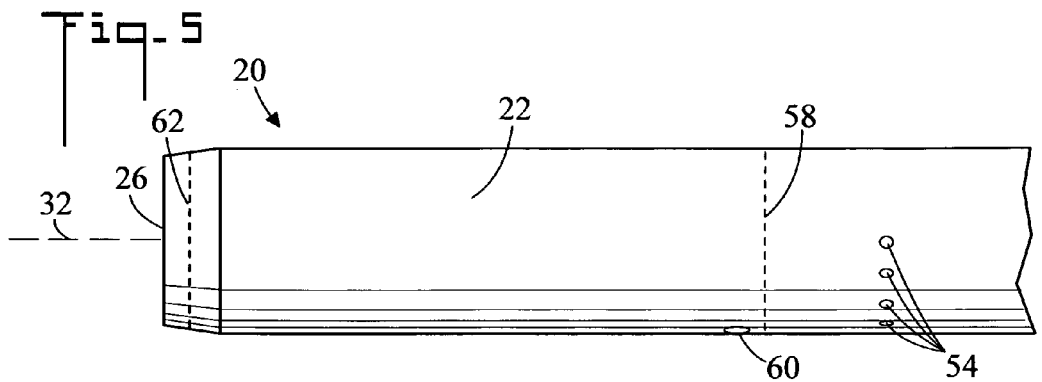
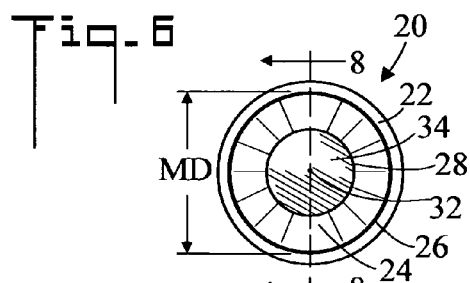
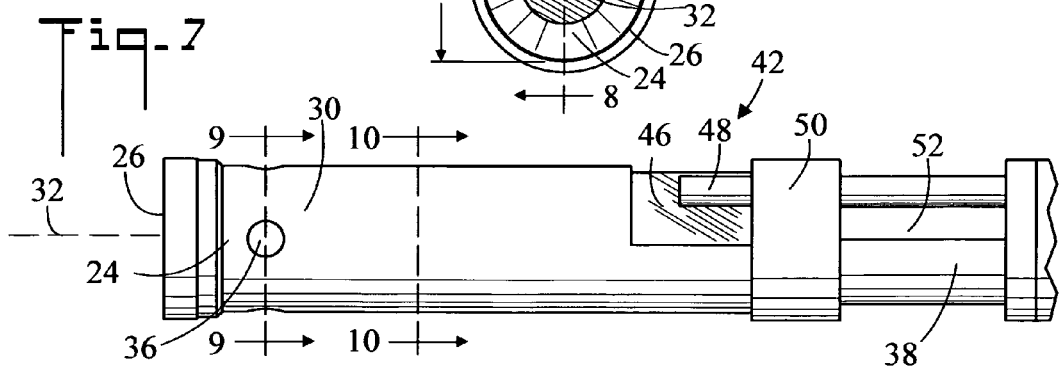
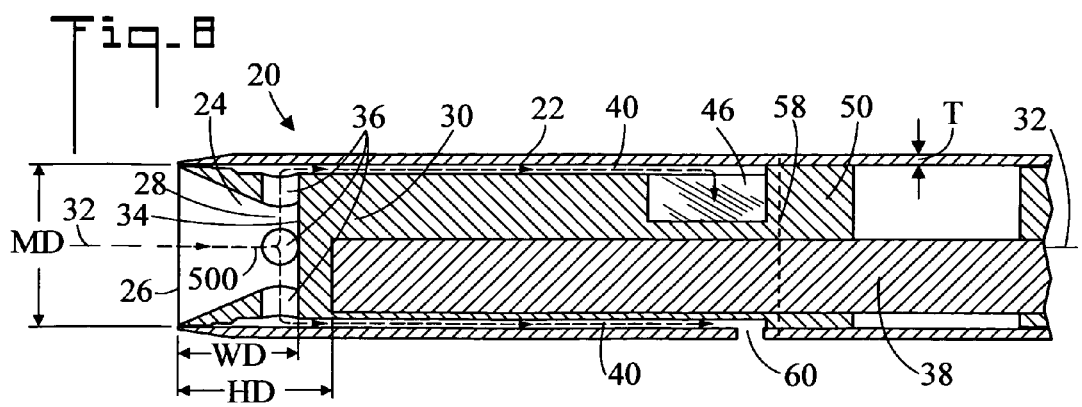

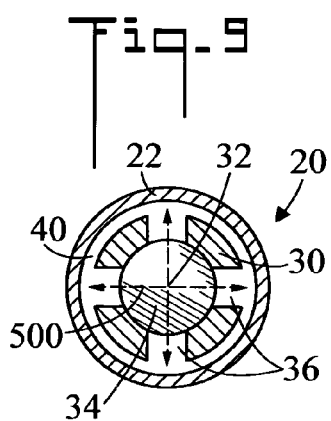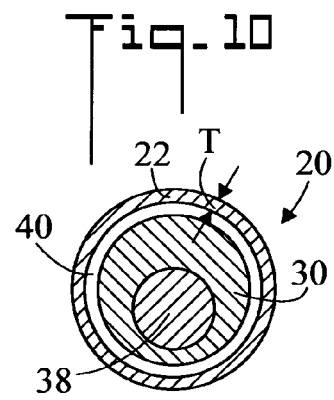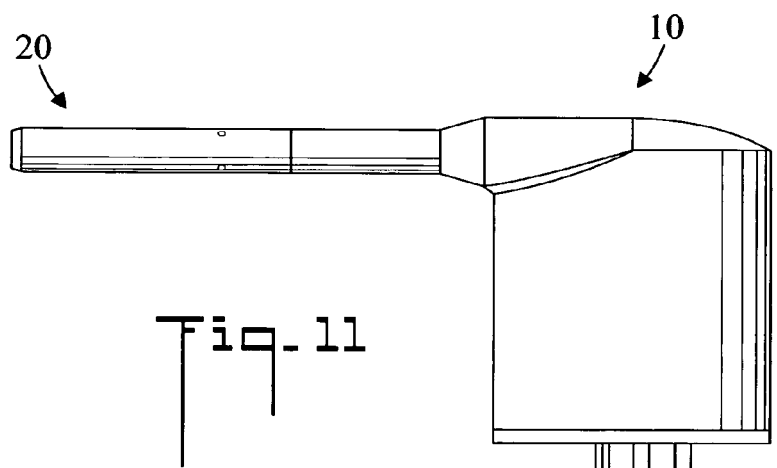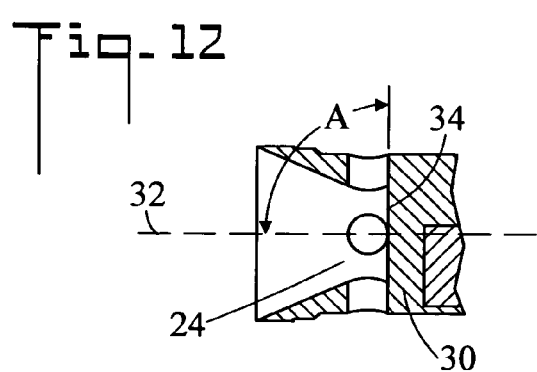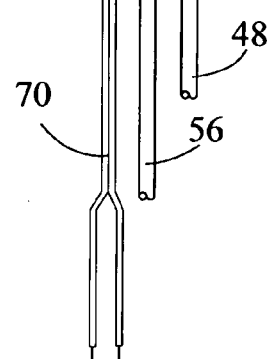

NOSE SECTION FOR A PITOT PROBE

CROSS REFERENCE TO RELATED APPLICATION

This application claims the filing benefit under 35 U.S.C. §119(e) of U.S. Provisional Application No. 60/881,862 filed Jan. 23, 2007, which is hereby incorporated by reference.

TECHNICAL FIELD

The present invention pertains generally to air pressure measuring instruments which are used to determine air speed, and more particularly to the nose section of such an instrument.

BACKGROUND OF THE INVENTION

Aircraft air pressure measuring instruments are used to measure air pressure pitot tube is commonly used for this purpose. The pitot tube consists of a tube which points directly into the air flow, and which brings the moving air to rest. The resulting pressure within the Pitot tube is called the total pressure (sometimes called stagnation pressure or pitot pressure). Another pressure is the static pressure which exists outside the aircraft's fuselage. The static pressure may be measured with static ports on the aircraft's fuselage, or the pitot tube may itself contain the static ports, wherein it is termed a pitot-static tube. The total pressure and the static pressure are then used to calculate dynamic pressure, which is the pressure caused by the aircraft's motion, and which is proportional to air speed. The equation for determining dynamic pressure (air speed) is:

$$\text{dynamic pressure} = \text{total pressure} - \text{static pressure}$$

Modern aircraft require measurement of the total air pressure as a critical input into the air data system used to compute many flight-critical parameters such as true airspeed, altitude, temperature, and flight mach number. The total pressure is measured using any number of devices such as a "pitot probe", "total pressure probe", or "pitot-static probe"—and for the sake of this disclosure, all such devices are hereafter called "probe". The front end of the probe that faces into the air flow is called the nose section.

For pressure probes to function correctly on air craft which operate in adverse weather conditions, it is necessary to heat the probe such that no ice can build up in flight to corrupt the measurement. In fact, the FAA has strict oversight as to whether an aircraft is certified for "known icing conditions"—something that can only be achieved using a high-performance heated probe.

Probe designs that exist in the market today all have common design elements as follows:
1) The air passage into the nose section is straight into the body of the probe.
2) In conventional designs heating is applied around the air passage which runs centrally down the probe nose section.
3) Heated probes are large in diameter, not generally less than 0.625 inches at the largest diameter section for pitot-static probes, and not less than 0.50 inches for pitot probes.
4) Conventional heated probes have much higher power consumption, from 150 watts to much higher values

BRIEF SUMMARY OF THE INVENTION

The present invention is directed to a nose section for a heated probe which offers substantial advantages over existing devices. Because of its unique design, the probe of the present invention is smaller and consumes much less power. The present invention has the following major benefits as compared to conventional technology:
1) A small probe diameter—approximately 0.32 inches in diameter—as compared to existing probes that are 0.55 inches diameter and above. This small probe allows for at least a 50% reduction in diameter as compared to the smallest probes on the market today.
2) A substantial weight reduction—important advantage for new, lighter jets and unmanned air vehicles.
3) The heater is located close to the front edge of the probe so as to heat up the sharp leading edge with a minimum amount of heater power. The heater is therefore highly concentrated at the nose. Conventional designs use methods of heating that involve the application of heat around the pitot air passage which runs centrally up the bore of the probe.
4) The air entry point is not along the axis of the probe like conventional probes. Instead, air striking the probe hits a wall at the inlet where the heater is located then gets diverted at 90 degrees right at the nose inlet. To create an adequate amount of inlet area for air to enter (and to avoid a constriction that affects performance), multiple perpendicular air channels (or ports) are located at the nose inlet (i.e. a plurality of inlet ports) so as to achieve a high net inlet cross sectional area. This unique inlet design has the added benefit of resisting contamination from entering the probe and it creates a labyrinth to reduce the ability of water to enter the probe inlet during flight conditions.
5) The use of multiple perpendicular air ports at the inlet (i.e. as opposed to a single straight-through air channel) makes the probe immune to performance issues due to blockage of a single air channel.
6) The inclusion of perpendicular air ports allows a highly concentrated heater coil to be place directly behind the wall very close to the probe inlet. This allows for greatly reduced power consumption.
7) The close proximity of the heater coil, combined with small physical diameter and cross-section of the probe, yields a high performance probe with substantially lower power—at least 50% lower than conventional probes.

In accordance with a preferred embodiment of the invention, a nose section for a heated air pressure probe includes and inlet which accepts incoming air. A barrier is disposed adjacent to the inlet and blocks the passage of air from the inlet. A heater is connected to the barrier and conductively heats both the barrier and the inlet.

In accordance with an aspect of the invention, the inlet has a mouth diameter, and the barrier has a wall disposed adjacent to the inlet. The wall is disposed a wall distance from the mouth of the inlet, the wall distance being less than the mouth diameter of the inlet.

In accordance with another aspect of the invention, the barrier is centrally disposed along the centerline of the nose section.

In accordance with another aspect of the invention, the nose section has a longitudinal centerline, and the wall is oriented perpendicular to the centerline.

In accordance with another aspect of the invention, the heater is disposed behind the wall.

In accordance with another aspect of the invention, the nose section has a centerline and the heater is either offset from the centerline or centered on the centerline.

In accordance with another aspect of the invention, the inlet has at least one bypass port for routing air around the barrier.

In accordance with another aspect of the invention, the inlet includes a plurality of bypass ports.

In accordance with another aspect of the invention, an outer tube is disposed around the barrier so that an air passage is formed between the outer tube and the barrier. The bypass ports(s) open into the air passage.

In accordance with another aspect of the invention, the barrier has a rear portion opposite the wall. A total pressure chamber is disposed at the rear portion.

In accordance with another aspect of the invention, the total pressure chamber includes a cavity in the rear portion of the barrier.

In accordance with another aspect of the invention, the outer tube is fabricated from stainless steel.

In accordance with another aspect of the invention, the outer tube is disposed around the inlet and the barrier. The outer tube is only connected to the rear portion of the barrier, and is also connected to the inlet.

In accordance with another aspect of the invention, the outer tube has a drain hole disposed near the connection of the barrier to the outer tube.

Other aspects of the present invention will become apparent from the following detailed description, taken in conjunction with the accompanying drawings, which illustrate, by way of example, the principles of the invention.

BRIEF DESCRIPTION OF THE DRAWINGS

FIG. 1 is a perspective view of a probe in accordance with the present invention;

FIG. 2 is an exploded perspective view of the probe showing an outer tube removed;

FIG. 3 is an enlarged perspective view of area 3 of FIG. 1;

FIG. 4 is an enlarged perspective view of area 4 of FIG. 2

FIG. 5 is an enlarged side elevation view of the nose section of the probe;

FIG. 6 is an enlarged front elevation view of the nose section;

FIG. 7 is an enlarged side elevation view of the nose section with the outer tube removed;

FIG. 8 is a cross sectional view along the line 8-8 of FIG. 6;

FIG. 9 is a cross sectional view along the line 9-9 of FIG. 7;

FIG. 10 is a cross sectional view along the line 10-10 of FIG. 7;

FIG. 11 is a side elevation view of another embodiment of the probe; and,

FIG. 12 is a fragmented cross sectional view as in FIG. 6 showing the angular orientation of a wall.

DETAILED DESCRIPTION OF THE INVENTION

Referring initially to FIGS. 1 and 2, there are illustrated perspective and exploded perspective views respectively of a probe in accordance with the present invention, generally designated as 10. Probe 10 includes nose section 20 which faces into the oncoming air flow. Nose section 20 includes an outer tube 22 which is shown removed in FIG. 2. In the shown embodiment, probe 10 has a cylindrical shape, however it may be appreciated that other shapes are also possible. Also, while the shown embodiment of the invention is targeted at aircraft usage, it may be appreciated that the principles of the invention could also be applied to other fluid flow applications.

FIGS. 3 and 4 are enlarged perspective views of areas 3 and 4 of FIGS. 1 and 2 respectively. In FIG. 4, outer tube 22 has been removed. Nose section 20 includes an inlet 24 through which incoming air flows. Inlet 24 has a conical shape which tapers from mouth 26 (front edge) to throat 28 (refer to FIG. 8). Mouth 26 of inlet 24 has a mouth diameter MD (refer to FIGS. 6 and 8). A barrier 30 is disposed adjacent to (adjoining) inlet 24, and blocks the passage of air from inlet 24. That is, barrier 30 is centrally positioned within nose section 20 so that air exiting inlet 24 is prevented from following a straight path generally parallel to longitudinal centerline 32 of nose section 20. Rather, the air is blocked and diverted away from centerline 32 by barrier 30. To that end, barrier 30 includes a wall 34 which is disposed adjacent to inlet 24. In the shown embodiment, wall 34 is oriented perpendicular to centerline 32, so that incoming air 500 is blocked by wall 34 and diverted in a path which is about 90° away from centerline 32 (refer to FIG. 8). It may be appreciated however, that wall 34 could have other angular orientations which also block and divert incoming air away from centerline 32. That is, the angle of diversion can be the shown 90°, or another angle relative to centerline 32 (refer to FIG. 12 and the associated discussion). Inlet 24 further includes at least one bypass port 36 for routing air around wall 36 of barrier 30. In an embodiment of the invention, inlet 24 includes a plurality of bypass ports 36 (four in the shown embodiment). In the shown embodiment, bypass ports 36 are oriented perpendicular to nose section centerline 32. It may be appreciated that while shown circular in the figures, bypass ports 36 could have other shapes such as oval, square, slotted, etc.

FIGS. 5-6 are enlarged side elevation and front elevation views respectively of nose section. FIG. 7 is a side elevation view of nose section 20 with outer tube 22 removed. These figures show outer tube 22, inlet 24, mouth 26, throat 28, barrier 30, centerline 32, wall 34, and bypass ports 36. It is noted that inlet 24 and barrier 30 are integral and form a central core about which outer tube 22 is disposed. In an embodiment of the invention, outer tube 22 is fabricated from stainless steel. Because of its relatively low thermal conductivity, stainless steel better insulates inlet 24 and barrier 34 from the low temperatures encounter in flight.

FIG. 8 is a cross sectional view along the line 8-8 of FIG. 6. A heater 38 is connected to and conductively heats barrier 30 and inlet 24 (also refer to FIGS. 7 and 10). Heater 38 is disposed behind wall 34 (that is on the opposite side of wall 34 from inlet 24). In the shown embodiment, heater 38 has an elongated cylindrical shape, and is fixedly disposed within and directly heats barrier 30. It is further noted that heater 38 is offset from centerline 32 of nose section 20. This offset allows the overall diameter of nose section 20 to be minimized. In an alternative embodiment, heater 38 can be centered on centerline 32. Wall 34 is disposed a wall distance WD from mouth 26 of inlet 24, wherein wall distance WD is less than mouth diameter MD. Further, the front portion of heater 38 is disposed a heater distance HD from mouth 26 of inlet 24, wherein heater distance HD is also less than mouth diameter MD. In an embodiment of the invention, MD is about 0.290 inches, WD is about 0.2 inches, and heater distance HD is about 0.26 inches. By placing heater 38 in centrally disposed barrier 30 and near inlet 24, more efficient heating is realized. Incoming air 500 passes through inlet 24 and is blocked by wall 34 of barrier 30. Wall 34 diverts the air 500 away from centerline 32 and into port(s) 36.

Referring to FIGS. 8, 9, and 10, outer tube 22 is disposed around barrier 30 so that an air passage 40 is formed between outer tube 22 and barrier 30. At least one bypass ports 36 (four shown) open into air passage 40. As such, incoming air 500 is routed by wall 34 and bypass ports 36 all around heated barrier 30, which results in more efficient heating. In the shown embodiment, air passage 40 has a cylindrical shape. In FIGS. 9 and 10, it is noted that barrier 30 is centrally disposed along centerline 32 within outer tube 22. Referring to FIGS. 8 and 10, in an embodiment of the invention outer tube 22 has a wall thickness T, which is less than one tenth mouth diameter MD of inlet 24.

Referring again to FIGS. 4 and 7, barrier 30 includes front wall 34 and an opposite rear portion 42. A total pressure chamber is disposed at rear portion 42. In the shown embodiment, the total pressure chamber includes a cavity 46 (or cutout) in rear portion 42. A total pressure tube 48, which carries the total pressure rearward to the air data system, opens into cavity 46. By positioning the total pressure tube 48 in cavity 46 and away from outer tube 22, a baffling effect is realized wherein it is more difficult for unwanted water to enter total pressure tube 48. Rear portion 42 of barrier 30 also includes a seal 50 which seals barrier 30 to outer tube 22 (refer to FIGS. 7 and 8). Air passage 40 and cavity 46 combine to form what is commonly termed a total pressure plenum. A static pressure plenum 52 is disposed behind seal 50, and is exposed to static pressure via static pressure holes 54 (refer to FIGS. 3 and 5). Static pressure is also carried rearward to the air data system by static pressure tube 56.

Returning to FIGS. 5 and 8, outer tube 22 is disposed around inlet 24 and barrier 30. Outer tube 22 is connected to barrier 30 only at rear portion 42. The connection 58 is shown as a broken line, and extends circumferentially around outer tube 22. Connection 58 is effected by circumferentially soldering, brazing, or welding seal 50 of barrier 30 to outer tube 22. Outer tube 22 has a drain hole 60 which is disposed near connection 58 of barrier 30 to outer tube 22. Because drain hole 60 is near connection 58, heat from heater 38 will be conductively transmitted through barrier 30 to drain hole 60. As such, any water which does accumulate at drain hole 60 will not freeze and thereby block drain hole 60. A similar situation exists at the leading edge of inlet 24 where ice can build up. Another connection 62 of outer tube 22 is disposed near mouth 26 of inlet 24 and results in both ice prevention and efficient heating of incoming air 500. By selectively applying heat in only the two areas needed (inlet 24 and drain hole 60), the overall power consumption of probe 10 is reduced because very little heat is transferred down the probe and thereby wasted. This is particularly true when outer tube 22 is fabricated from stainless steel, which is a relatively poor heat conductor.

FIG. 11 is a side elevation view of another embodiment of probe 10. In this embodiment nose section 20 is included in a L-shaped probe. Total pressure tube 48 and static pressure tube 56 are shown exiting probe 10 on route to the air data system. Also, electrical wiring 70 brings power to heater 38. Similar probe elements may be seen in FIGS. 1 and 2.

FIG. 12 is a fragmented cross sectional view as in FIG. 6 showing the angular orientation of wall 34. Wall 34 makes an angle A with centerline 32. In the shown embodiment angle A is 90°, and thereby incoming air 500 (refer to FIG. 8) is diverted 90° from centerline 32. However angle A could also be other angles and thereby divert the incoming air 500 at other angles greater than zero degrees with respect to centerline 32.

The preferred embodiments of the invention described herein are exemplary and numerous modifications, variations, and rearrangements can be readily envisioned to achieve an equivalent result, all of which are intended to be embraced within the scope of the appended claims.

I claim:

1. A nose section for a probe, comprising:
an inlet;
a barrier disposed adjacent to said inlet;
said barrier blocking the passage of air from said inlet;
a heater connected to said barrier;
said inlet having a mouth having a mouth diameter;
said barrier having a wall disposed adjacent to said inlet; and,
said wall disposed a wall distance from said mouth of said inlet, said wall distance being less than said mouth diameter.

2. A nose section for a probe, comprising:
an inlet;
a barrier disposed adjacent to said inlet;
said barrier blocking the passage of air from said inlet;
a heater connected to said barrier;
said nose section having a centerline; and,
said heater being cylindrical and having a heater centerline which is offset from said centerline.

3. A nose section for a probe, comprising:
an inlet;
a barrier disposed adjacent to said inlet;
said barrier blocking the passage of air from said inlet;
a heater connected to said barrier;
said inlet having a plurality of bypass ports for routing air around said barrier and said heater.

4. A nose section for a probe, comprising:
an inlet;
a barrier disposed adjacent to said inlet;
said barrier blocking the passage of air from said inlet;
a heater connected to said barrier;
said barrier having a wall and an opposite rear portion; and,
a total pressure chamber disposed at said rear portion.

5. The nose section according to claim 4, further including:
said total pressure chamber including a cavity in said rear portion of said barrier.

6. A nose section for a probe, comprising:
an inlet;
a barrier disposed adjacent to said inlet;
said barrier blocking the passage of air from said inlet;
a heater connected to said barrier;
an outer tube disposed around said inlet and said barrier;
said barrier having a rear portion;
said outer tube connected to said inlet; and,
said outer tube connected to said barrier only at said rear portion.

7. A nose section for a probe, comprising:
an inlet;
a barrier disposed adjacent to said inlet;
said barrier blocking the passage of air from said inlet;
a heater connected to said barrier;
said inlet having a mouth having a mouth diameter;
said barrier having a wall disposed adjacent to said inlet and an opposite rear portion;
said wall disposed a wall distance from said mouth of said inlet, said wall distance being less than said mouth diameter;
said nose section having a centerline;
said barrier centrally disposed along said centerline;
said wall oriented perpendicular to said centerline;
said heater offset from said centerline;
said inlet having including a plurality of bypass ports for routing air around said barrier;
an outer tube disposed around said barrier so that an air passage is formed between said outer tube and said barrier;
said plurality of bypass ports opening into said air passage; and,
a total pressure chamber disposed at said rear portion.

8. A nose section for a probe, comprising:
an inlet;
a barrier disposed adjacent to said inlet;
said barrier blocking the passage of air from said inlet;
a heater connected to said barrier;
said inlet having a mouth having a mouth diameter;
said heater having a front portion disposed a heater distance from said mouth; and,
said heater distance being less than said mouth diameter.

* * * * *